United States Patent [19]

Nakamura et al.

[11] Patent Number: 4,730,375

[45] Date of Patent: Mar. 15, 1988

[54] METHOD FOR THE ASSEMBLY OF A SCROLL-TYPE APPARATUS

[75] Inventors: Toshiyuki Nakamura; Masahiro Sugihara; Tsutomu Inaba; Masahiko Oide; Tadashi Kimura; Norihide Kobayashi, all of Wakayama, Japan

[73] Assignee: Mitsubishi Denki Kabushiki Kaisha, Tokyo, Japan

[21] Appl. No.: 885,778

[22] Filed: Jul. 15, 1986

Related U.S. Application Data

[62] Division of Ser. No. 734,048, May 15, 1985, Pat. No. 4,655,697.

[30] Foreign Application Priority Data

May 18, 1984 [JP] Japan ................................ 59-101267

[51] Int. Cl.[4] ................................ B23P 15/00

[52] U.S. Cl. ................................ 29/156.4 R; 277/81 P; 277/204; 277/216; 418/55; 418/142

[58] Field of Search ................................ 29/156.4 R; 418/55, 418/57, 142; 277/81 P, 204, 216

[56] References Cited

U.S. PATENT DOCUMENTS 801,182 10/1905 Creux ................................ 418/55

3,941,524 3/1976 Huf ................................ 418/142

3,994,636 11/1976 McCullough et al. ................................ 418/55

4,416,597 11/1983 Eber et al. ................................ 418/55

FOREIGN PATENT DOCUMENTS 7103081 5/1980 Australia .

65261 11/1982 European Pat. Off. ................................ 418/55

28240 6/1981 Japan .

0065261 11/1982 Japan .

*Primary Examiner*—P. W. Echols

*Assistant Examiner*—Ronald S. Wallace

*Attorney, Agent, or Firm*—Leydig, Voit & Mayer

[57] ABSTRACT

A scroll-type apparatus having an improved radial seal and a method for the assembly thereof is disclosed. The spiral wrap of a moving scroll and a stationary scroll are provided with gap adjusting means for providing a gap of a desired size between the top surface of the spiral wrap of each scroll and the top surface of the base plate of the opposing scroll. The gap adjustment means comprises a spiral-shaped elastic element which fits into a groove formed in the top surface of a spiral wrap or on top of a protrusion formed on the top surface of the spiral wrap, to form a nonpressurized seal. The elastic element is supported by the spiral wrap by friction, bonding, or solvent welding.

6 Claims, 29 Drawing Figures

METHOD FOR THE ASSEMBLY OF A SCROLL-TYPE APPARATUS

This application is a division of application Ser. No. 734,048, filed May 15, 1985, now U.S. Pat. No. 4,655,697 issued Apr. 7, 1987.

BACKGROUND OF THE INVENTION

The present invention relates to a scroll-type apparatus for use in a pump, a compressor, or an expander. In particular, it relates to a scroll-type apparatus having adjustable seal means for achieving an effective contacting or non-contacting radial seal of a desired size.

Rotating apparatuses of the scroll type have been known from long in the past. An early such apparatus was disclosed in U.S. Pat. No. 801,182 issued to Leon Creux in 1905. The apparatus disclosed therein was in the form of a rotary engine operated by an elastic fluid. The principles on which this engine are based have been applied to a large variety of machines, including compressors, pumps, and expanders in addition to engines.

In general, a scroll-type apparatus comprises two interfitting scrolls comprising parallel spiroidal or involute spiral wraps of the same shape which are mounted on separate parallel base plates. One of the spiral wraps is caused to rotate about the center of the second spiral wrap. The two spiral wraps touch one another at a certain number of points so as to form between the spiral wraps and base plates a plurality of compression chambers which change in size as the first spiral wrap is rotated. A compressible fluid introduced from the side of one of the spiral wraps is compressed as it is moved towards the center of the spiral wraps and then is then discharged from the center of the spiral wraps. By varying the direction of rotation, the apparatus can produce either expansion or compression of the compressible fluid.

While this type of apparatus has a number of advantages, it has significant problems related to wear and sealing. Due to the complicated non-linear motion of the parts, it is difficult to obtain effective radial and tangential seals. If such an apparatus is to operate efficiently, effect axial contact must be realized between the ends of the involute spiral wraps and the base plate surfaces which they contact to seal against radial leakage, Furthermore, effective radial contact must be attained between the pairs of spiral wraps where they contact one another.

One means which has been used in the past of achieving radial sealing is to machine the wraps and base plates to highly accurate shapes so that there is only a very small gap left between the ends of the spiral wraps and the opposing base plates, and these gaps are sealed by an oil film formed by oil entrained with the fluid being compressed. However, this method is disadvantageous in that the machining is extremely costly, and it is impossible to achieve clearances which allow effective sealing at all times during operation. Namely, a gap which is of the appropriate size for use when the apparatus is cool will be too small once the scrolls become heated during operating and thermal expansion of the spiral wraps closes the gaps, resulting in seizing. On the other hand, if the initial dimensions are such that an effective seal will be maintained after thermal expansion has occurred, then the gap will be too large when the apparatus is cool, and effective sealing will not be maintained. Furthermore, as the amount of thermal expansion is not uniform throughout the apparatus, the machining process becomes even more complicated.

U.S. Pat. No. 3,994,636 discloses a scroll-type apparatus in which a radial seal is achieved by seal elements associated with involute wraps which are urged by an axial force to make sealing contact with the base plates of the opposing scroll members. Spiral-shaped seal members are placed in grooves formed in the top of the spiral wraps. The grooves are wider than the seal members so that pressurized fluid can enter the bottom of the grooves and press the seal members against the base plate of the opposing scroll and achieve a contacting seal.

Since the seal members do not completely fill the grooves, it is possible for pressurized fluid to flow along the grooves in the spiral direction from an area of high pressure to one of low pressure, i.e., from one compression chamber to another. Accordingly, even though the seal members can provide a seal in the radial direction of the scrolls, the seal in the tangential direction is not fully satisfactory.

Furthermore, since the seal members are forced against the opposing base plates, frictional resistance decreases the efficiency of the apparatus and produces wear of both the seal members and the base plates.

Japanese patent publication No. 56-28240 also discloses a scroll apparatus in which seal members provided in grooves in the end surfaces of the spiral wraps are forced against the opposing base plates by pneumatic face force. That invention has the same drawbacks as the above in that it is possible for pressurized fluid to leak in the tangential direction from an area of high pressure to low pressure, and the contact between the seal members and the base plates produces wear and reduces efficiency.

SUMMARY OF THE INVENTION

It is the object of the present invention to provide a scroll-type apparatus for use in a compressor, a pump, or an expander in which an effective non-contacting adjustable radial seal can be achieved between the end surfaces of spiral wraps and the opposing base plates.

It is another object of the present invention to provide a scroll-type apparatus which achieves an effective tangential seal between the spiral wraps of the apparatus.

It is another object of the present invention to provide a scroll-type apparatus the parts of which need be machined only to conventional tolerances.

It is another object of the present invention to provide a method for the assembly of this scroll-type apparatus.

In a scroll-type apparatus according to the present invention, an effective radial seal is achieved by adjustable sealing means comprising elastic elements supported by the top ends of the spiral wraps so as to protrude towards the opposing base plates. The elements are prismatic members which extend along the top surface of the spiral members and either are supported in grooves formed in the top surface of the spiral members or else are supported on top of protrusions formed on the top surfaces. The elements are supported by friction, by solvent welding, or by bonding between the element and the spiral wraps so that the elements will not move in the axial direction of the scroll unless force is applied thereto by the opposing base plates. The size of the gap between the top surface of the elements and the top surface of the base plate of the opposing scroll can be adjusted by adjusting the amount by which the elements protrude from the grooves or protrusions so that an effective non-contacting, non pressurized, radial seal can be achieved while permitting the parts to be machined to only conventional tolerances. As pressurized fluid does not enter the grooves, there is no leakage of the fluid along the groove as in the prior art apparatuses.

DESCRIPTION OF THE PREFERRED EMBODIMENTS

Figure 1:
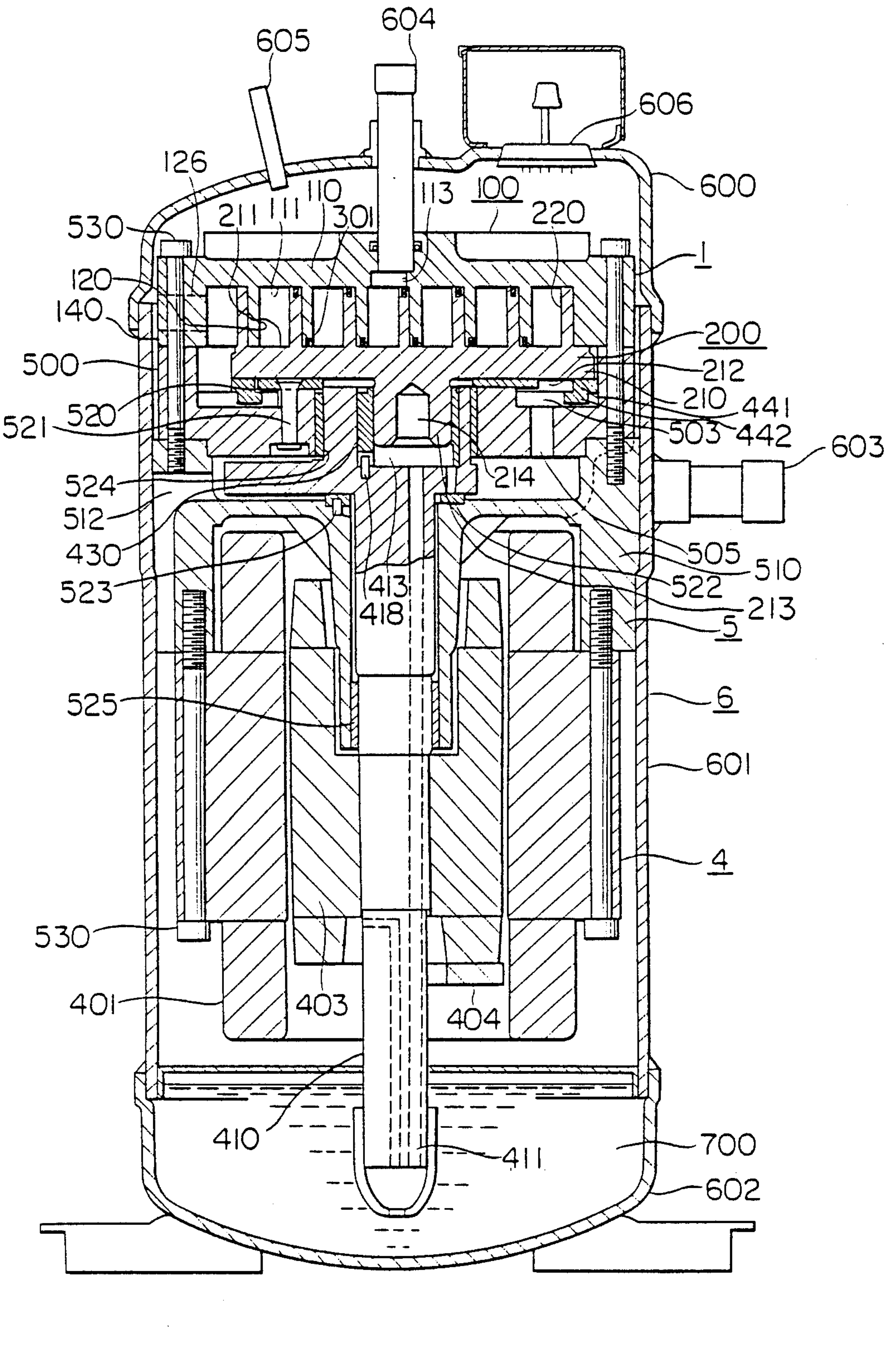
FIG. 1 is a vertical cross-sectional view of a first embodiment of a totally-sealed compressor of the scroll type according to the present invention.

Hereinbelow, a number of embodiments of the present invention will be described with reference to the accompanying drawings, in which the same reference numerals indicate identical or corresponding parts.

FIG. 1 shows a first embodiment of a scroll-type apparatus according to the present invention, which in this embodiment is a totally-sealed compressor suitable for compression of refrigerant gas in a heat pump or the like.

The compressor generally comprises a scroll portion 1 having a stationary scroll and a moving scroll, a drive portion 4 having a motor which drives the moving scroll so as to perform planetary movement around the center of the stationary scroll, a support portion 5 which supports both the scroll portion and the drive portion, and a shell 6 which totally encloses and supports the other portions. Each of these portions will be described in detail, beginning with the scroll portion.

Figure 8:
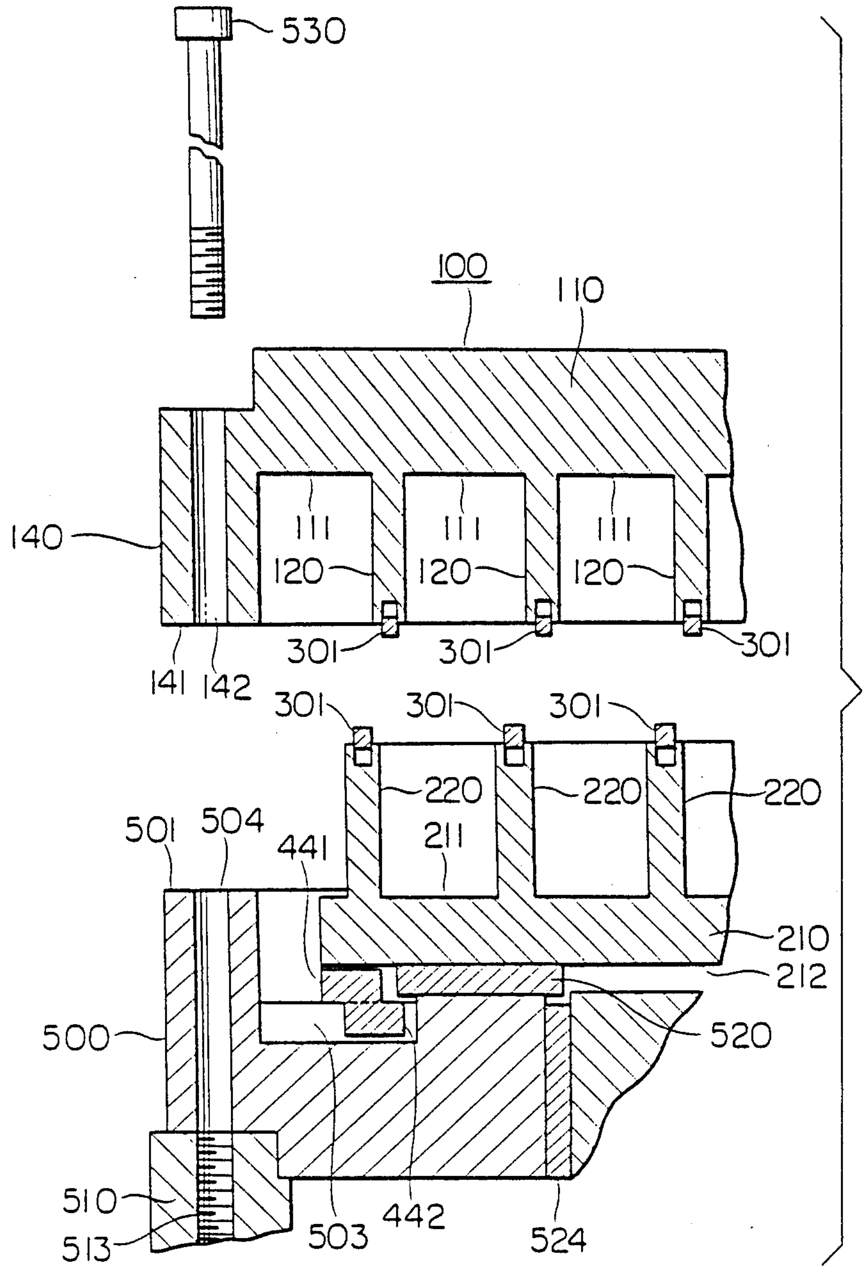
FIG. 8 is an exploded cross-sectional view of the scroll portion of the embodiment of FIG. 1.

The scroll portion 1 comprises a stationary scroll 100, a moving scroll 200, and gap adjustment means for providing a gap of a desired size between the confronting ends of the stationary scroll 100 and the moving scroll 200, thereby achieving a radial seal between adjacent portions of the stationary scroll 100 and the moving scroll 200. The stationary scroll 100 comprises a disc shaped base plate 110 and a spiral wrap 120 which is integrally formed with and projects perpendicularly from one surface of the base plate 110. The spiral wrap 110 has the shape of an involute or the like with its center at the center of the base plate 110 on which it is formed. The surface of the base plate 110 from which the spiral wrap 120 projects will be referred to as the top surface 111 of the base plate 110, even though in FIG. 1 the top surface 111 faces downwards. Similarly, the surface of the end of the spiral wrap 120 which is farthest removed from the base plate 110 on which it is formed will be referred to as the top surface 123 of the spiral wrap. All portions of the top surface 123 of the spiral wrap 120 lie in a plane which is parallel to the top surface 111 of the base plate 110. In the outer periphery 140 of the spiral wrap 120 of the stationary scroll 100, a hole is cut which serves as an intake port 126. In the center of the base plate 110, another hole is cut which serves as an exhaust port 113. As shown in FIG. 8, a number of bolt holes 142 are cut in the axial direction in the outer periphery 140 of the stationary scroll 100.

Similarly, the moving scroll 200 comprises a disc-shaped base plate 210 and a spiral wrap 220 which is integrally formed therewith and projects perpendicularly from the top surface 211 of the base plate 210. The shape of this spiral wrap 220 is identical to the shape of the spiral wrap 120 of the stationary scroll 100, and its center lies at the center of the base plate 210. A short shaft 213 is integrally formed on the bottom surface 212 of the base plate 210, and through this shaft 213 located at the center of the base plate 210 the moving scroll 200 is caused to perform planetary movement about the center of the stationary scroll 100. The center of this shaft 213 has a cavity 214 formed in its center to decrease the weight of the scroll 200.

When assembled, the stationary scroll 100 and the moving scroll 200 confront one another so that the top surface of the spiral wrap of each scroll faces and lies parallel to the top surface of the base plate of the opposite scroll. The dimensions of the scrolls are such that a minute gap exists between the top surface of each spiral wrap and the base plate of the opposing scroll. In order to seal this gap, each of the scrolls is provided with gap adjustment means.

Figure 2:
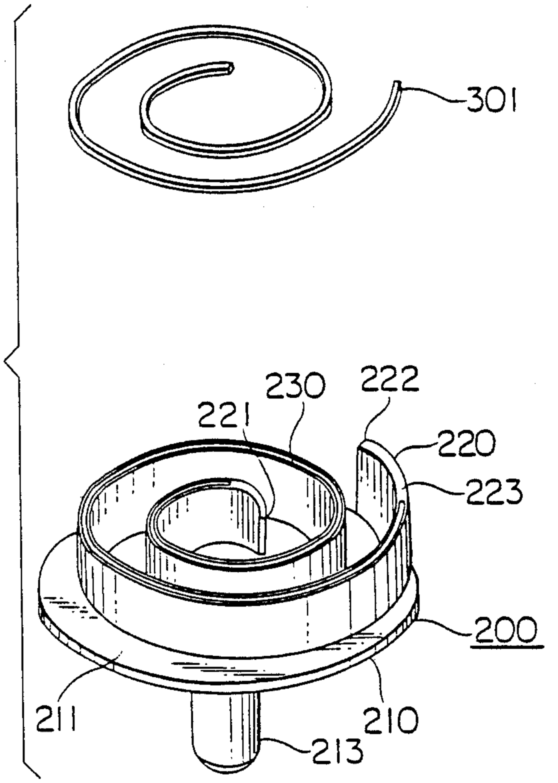
FIG. 2 is an exploded view of the moving scroll of the embodiment of FIG. 1.
Figure 3:
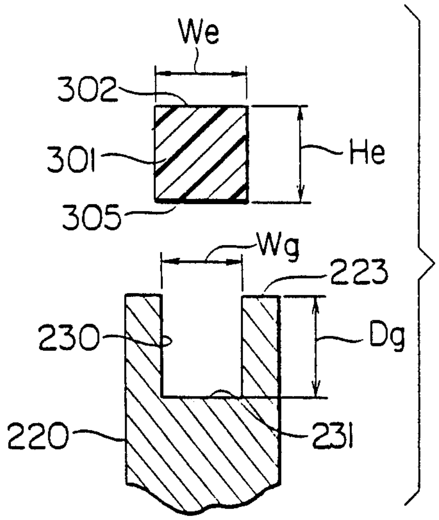
FIG. 3 is an enlarged cross-sectional view of a portion of the end of the spiral wrap of the scroll of FIG. 2.

The gap adjustment means comprises an elastic member 301 which fits into a spiral groove formed in the top surface of the spiral wrap of each scroll. The gap adjustment means and the corresponding groove are best illustrated in FIG. 2, which is an exploded view of the moving scroll 200 of the embodiment of FIG. 1, and in FIG. 3, which is a cross-sectional view of the area near the top surface 223 of the spiral wrap 220 of the moving scroll 200 of FIG. 2. The groove 230 has a spiral shape and extends along the top surface of the spiral wrap 220 except at the innermost portion 221 of the spiral wrap 220 and at the outermost portion 222. In this embodiment, the groove 230 has a rectangular cross section. The elastic element 301 is a prismatic member with a rectangular cross section having a length equal to the length of the groove 230. As shown in FIG. 3, the maximum width We of the element 301 prior to insertion into the groove 230 should be greater than or equal to the width Wg of the groove 230, and its height He should be less than or equal to the depth Dg of the groove 230. Furthermore, it should be made of a substance easily capable of undergoing elastic deformation, so that when it is pressed into the groove 230, compression of the sides of the element 301 by the sides of the groove 230 and friction will prevent it from falling out. A material having self-lubricating properties such as polytetrafluoroethylene is most appropriate for use in making the element 301. As the groove 230 does not extend to the ends of the spiral wrap 220 and the element extends for the entire length of the groove 230, the fluid being compressed can not enter the groove 230.

Although FIG. 2 shows only the moving scroll 200, the gap adjustment means for the stationary scroll 100 is identical in form.

The support portion 5 of the embodiment of FIG. 1 comprises an upper frame 500, a lower frame 510, and a number of bearings which support the moving scroll 200 and the drive portion 4. The upper frame 500 has a circular outer periphery having the same shape as that of outer periphery 140 the stationary scroll 100, and the top surface of a ring-shaped ledge formed in its upper half serves as a mounting surface 501 for the stationary scroll 100.

The lower frame 510 also has a circular outer periphery which is the same shape as that of the upper frame 500 but somewhat larger in diameter. The top surface of the lower frame 510 and the bottom surface of the upper frame 500 are both flat so that the two can be sealingly connected together by means of a faucet joint or the like. The upper frame 500 has bolt holes 504 formed in its outer periphery corresponding to the bolt holes 142 formed in the stationary scroll 100, and the lower frame 510 has corresponding threaded bolt holes 513 formed in its outer periphery (see FIG. 8). The stationary scroll 100, the upper frame 500, and the lower frame 510 are rigidly secured to one another by means of bolts 530 which pass through these holes and screw into the lower frame 510.

The upper frame 500 has a circular hole formed in its bottom portion through which the top portion of a main shaft 410 passes. An upper journal bearing 524 is provided in this hole for guiding the rotation of the main shaft 410. The upper frame 500 is also provided with an upper thrust bearing 520 which supports the weight of the moving scroll 200. The upper thrust bearing 520 is prevented from moving with respect to the upper frame 500 by pins 521.

The lower frame 510 is provided with a ring-shaped lower thrust bearing 522 which supports the weight of the main shaft 410, and a cylindrical lower journal bearing 525 which surrounds the middle portion of the main shaft 410 and guides its rotation. The lower thrust bearing 522 is prevented from moving by pins 523. The lower frame 510 also has a number of threaded bolt holes formed in the bottom portion of its outer periphery.

The upper frame 500 and the lower frame 510 are formed with a number of oil return holes which enable lubricating oil to return to a sump in the bottom of the compressor. These will be described in more detail later on.

The drive portion 4 comprises a motor, a main shaft 410 driven by the motor, and means for making the moving scroll 200 perform planetary motion about the center of the stationary scroll 100 without rotating about its own axis. The motor comprises a stator 401 and a rotor 403 centrally disposed inside the stator 401 with a suitable air gap provided therebetween. The stator 401 is supported by the lower frame 510 through bolts 530 which pass through holes formed in the outer periphery of the stator 401 and screw into the above-mentioned threaded holes in the bottom of the lower frame 510.

The previously-mentioned main shaft 410 extends through the rotor 403 and is secured to the rotor 403 so as to rotate therewith. The bottom and middle portions of the main shaft 410 have roughly the same diameter, but the top portion of the main shaft 410 is formed with a portion 412 of increased diameter. The outer peripheral surface of this portion 412 is symmetrically disposed with respect to the longitudinal center of the shaft 410, but it has an eccentric circular hole 413 formed in it which is displaced to one side of the longitudinal center. The outer peripheral surface of this portion 412 is supported by the upper journal bearing 524. The eccentric hole 413 in the top of the shaft 410 houses an eccentric bushing 430 by which the main shaft 410 is connected with the shaft 213 of the moving scroll 200. The outer periphery 433 of the eccentric bushing 430 is circular and corresponds to the size and shape of the eccentric hole 413 formed in the increase-diameter portion 412 of the main shaft 410. The eccentric bushing 430 has a circular eccentrically-disposed hole 431 formed in it which has the same diameter as the short shaft 213 formed on the bottom of the moving scroll 200. The short shaft 213 fits into this hole 431.

Figure 5:
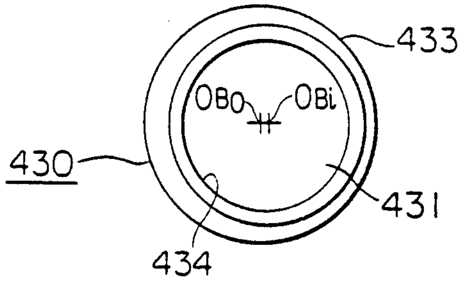
FIG. 5 is a top view of the eccentric bushing pictured in FIG. 4.
Figure 6:
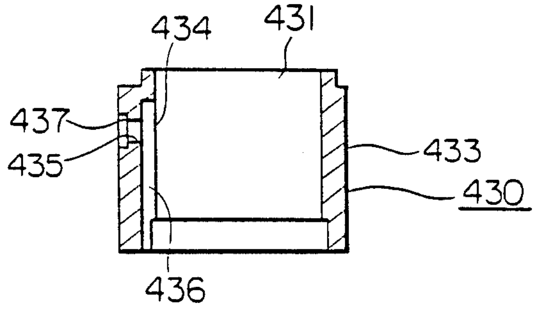
FIG. 6 is a vertical cross section of this same bushing.
Figure 7:
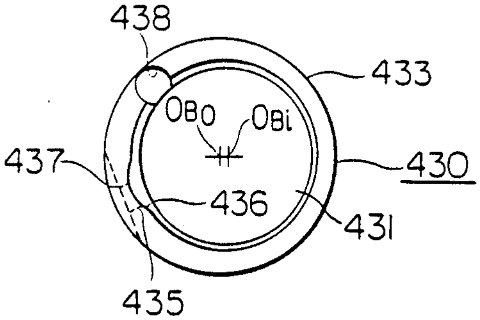
FIG. 7 is a bottom view of this bushing.

FIGS. 5 through 7 show the structure of the eccentric bushing 430 in detail. FIG. 5 is a top view, FIG. 6 is a vertical cross section, and FIG. 7 is a bottom view of the bushing 430.

In FIG. 5, it can be seen that the center OBo of the outer peripheral surface 433 of the eccentric bushing 430 is displaced from the center OBi of the inner peripheral surface 434 of the bushing 430.

A vertically-extending oil groove 436 is formed, in the inner surface of the bushing 430. Its bottom end opens onto the bottom end surface of the eccentric bushing 430 while its upper end abuts against the inner surface of the eccentric bushing 430. A horizontal oil hole 435 is formed in the wall of the bushing 430 so as to communicate between the oil groove 436 and the outer peripheral surface of the bushing 430. A circumferentially-extending cut-out portion 437 is provided in the outer peripheral surface 433 of the bushing 430. The radially-outward end of the oil hole 435 opens onto this cut-out portion 437. A rotation-preventing hole 438 is cut into the wall of the eccentric bushing 430 at its lower end surface. The eccentric bushing 430 is formed of an aluminum alloy, lead bronze, or other bearing material.

Figure 4:
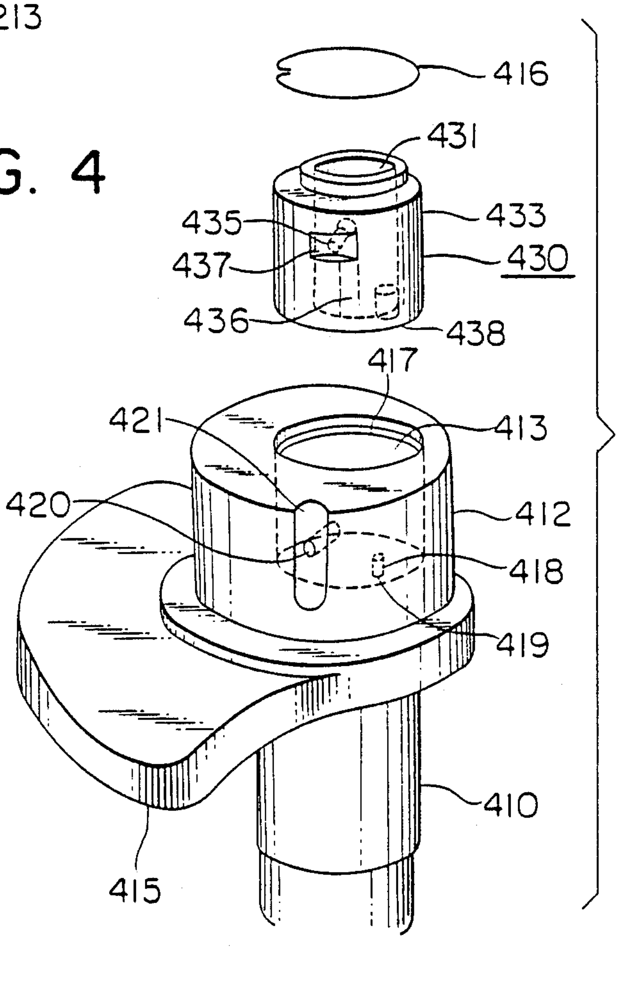
FIG. 4 is an exploded view of the top portion of the main shaft of the embodiment of FIG. 1.

As shown in FIG. 4, a spring pin 418 which has roughly a C-shaped cross section fits into a pin hole 419 formed in the bottom surface of the eccentric hole 413 of the main shaft 410. The eccentric bushing 430 fits into the eccentric hole 413 so that the rotation-preventing hole 438 formed in the bottom portion of the eccentric bushing 430 fits on this spring pin 418. A snap ring 416 fits over a circumferentially-extending snap ring groove 417 formed in the inner surface of the eccentric hole 413. The snap ring 416 is made of an elastic wire such as piano wire formed into the shape of a C.

As best seen in FIG. 4, the main shaft 410 has an eccentrically located counterweight 415 formed near its top just below the portion of increased diameter 412. The center of gravity of this counterweight 415 is located on the opposite side of the longitudinal axis of the main shaft 410 from the center of the eccentric hole 413. The bottom portion of the rotor 403 is also formed with a counterweight 404 located on the opposite side of the longitudinal center of the main shaft 410 from the top counterweight 415.

In the present embodiment, the means for causing the moving scroll 200 to perform planetary motion about the center of the stationary scroll 100 comprises an Oldham's joint. The Oldham's joint comprises an intermediate ring 441 with keys formed on its top and bottom surfaces at intervals of 90 degrees along the periphery of the ring 441. Two keys 442 are formed on the bottom surface of the ring 441 and are separated by 180 degrees. They keys 442 are disposed so as to be able to slide in grooves 503 formed in the upper frame 500, whereby the ring 441 is enabled to slide from left to right in FIG. 1 while being guided by the keys 442. Another pair of unillustrated keys formed on the top surface of the ring 441 slide in unillustrated grooves formed in the bottom surface of the base plate 210 of the moving scroll 200 and are disposed 90 degrees apart from the illustrated grooves 503.

The parts described above are completely enclosed in a cylindrical metal shell 6. The shell 6 comprises a cylindrical middle portion 601 which supports the lower frame 510 as well as a lid 600 and a bottom portion 601 which fit over the ends of the middle portion 601 of the shell 6 and are sealingly welded thereto. The lower frame 510 of the support portion 5 is rigidly secured to the middle portion 601 of the shell 6 by shrink fitting, spot welding, or the like. The middle portion 601 is penetrated by an intake pipe 603 which connects to the intake port 126 of the stationary scroll 100 via unillustrated channels formed in the upper frame 500 and lower frame 510. The bottom portion 602 of the shell 6 is filled with lubricating oil 700 which is circulated throughout the compressor by an oil supply system to be described below. The bottom portion 602 thus serves as an oil sump for the storage of the oil 700.

The lid 600 of the shell 6 is penetrated by an exhaust pipe 604 which communicates with the exhaust port 113 formed in the center of the stationary scroll 100. An oil supply pipe 605 also passes through the lid 600 of the shell 6 and communicates with a cavity inside the lid 600 above the stationary scroll 100. This oil supply pipe 605 is used during assembly to evacuate air from inside of the shell 6 once all the other openings have been sealed and is also used to initially provide lubricating oil 700 for the motor. It is sealed during operation of the compressor. A sealed electrical terminal 606 also passes through the lid 600 of the shell 6. Unillustrated electrical connections from the terminal 606 connect to the motor and provide electricity for the operation of the motor.

The assembly of the scroll portion 1 will now be described with the aid of FIGS. 8 through 13. FIG. 8 is an exploded view of the stationary scroll 100 and the moving scroll 200 as they would appear during assembly. The moving scroll 200 is placed atop the lower frame 510 with the bottom surface 212 of its base plate 210 resting on the upper thrust bearings 520. The elastic elements 301 are inserted into the grooves of the stationary scroll 100 and the moving scroll 200 so that they protrude from the grooves for most of their heights. The stationary scroll 100 is then positioned such that the bolt holes 142 in its outer periphery 140 align with the corresponding bolt holes 504 formed in the outer periphery of the upper frame 500, and the stationary scroll 100 is then placed over the moving scroll 200 and pressed downwards until the top surface 141 of its outer periphery 140 seats on the mounting surface 501 formed on the outer periphery of the upper frame 500. The bolts 530 are then passed through the bolt holes and screwed into the corresponding threaded 513 holes formed in the lower frame 510.

As mentioned earlier, when the stationary scroll 100 is properly seated on the upper frame 500, there will be a minute gap between the top surfaces 123 and 223 of each of the spiral wraps and the top surfaces 211 and 111 of the base plates of the opposing scrolls. Accordingly, when the stationary scroll 100 is placed over the moving scroll 200 and seated on the upper frame 500, the elastic elements 301 will be pushed into the grooves until they protrude by an amount equal to the size of the minute gap between the spiral wraps and the base plates.

Figure 9:
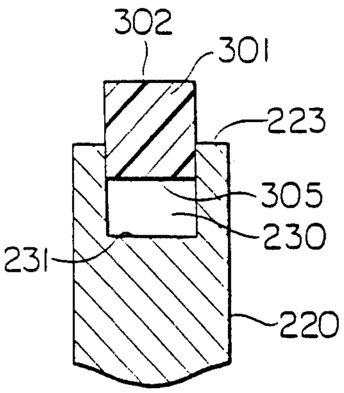
FIG. 9 is a cross-sectional view of the end of a spiral wrap member in FIG. 8, showing the state of the elastic element when before the stationary scroll and the moving scroll are assembled.
Figure 10:
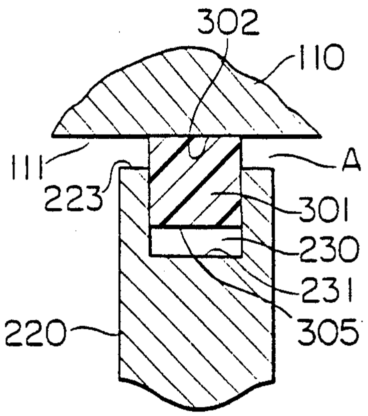
FIG. 10 is a cross-sectional view similar to FIG. 9, showing the state when the elastic element has been pushed into the groove in the end of the spiral wrap.

FIG. 9 is an enlarged cross-sectional view of a portion of the spiral wrap 220 of the moving scroll 200 of FIG. 8, showing the condition of the elastic element 301 before the stationary scroll 100 is placed atop the moving scroll 200, and FIG. 10 is a similar cross-sectional view showing the situation after the stationary scroll 100 has been placed on top of the moving scroll 200. Initially, the element 301 protrudes for much of its height from the groove 230, but when the stationary scroll 100 is placed over the moving scroll 200, it is then pushed into the groove 230 by the base plate 110 of the stationary scroll 100 so that it protrudes from the groove 230 by an amount A equal to the size of the gap between the top surface 223 of the spiral wrap 220 and the top surface 111 of the base plate 110 of the stationary scroll 100. In a similar way, the element 301 provided in the groove 130 of the spiral wrap 120 of the stationary scroll 100 is pushed into the groove 130 by the top surface 211 of the base plate 210 of the moving scroll 200. As the initial width of the element 301 is at least as great as the width of the groove, the element 301 will be compressed in the widthwise direction when it is pressed into the groove, there will be intimate contact between the sides of the groove and the sides of the element 301, and frictional force will hold it in place and prevent its falling out. The height of the element 301 is chosen such that when it is pressed into the groove 230 by the opposing base plate 110, there were still be left a gap between the bottom surface 305 of the element 301 and the bottom surface 231 of the groove 230. If during operation of the compressor, thermal expansion produces a decrease in the size of the gap between the top surface 223 of the spiral wrap 220 and the opposing base plate 110, the gap beneath the bottom surface 305 of the element 301 will enable the element 301 to be pressed further into the groove 230 by the opposing base plate 110, provided of course, that the element 301 is supported in groove 230 by friction.

In the situation illustrated in FIG. 10, there is substantially no gap between the top surface 302 of the element 301 and the top surface 111 of the opposing base plate 110. Accordingly, the element 301 will form a contacting seal and will prevent the fluid being compressed from leaking in the radial direction from one compression chamber to another.

Figure 11:
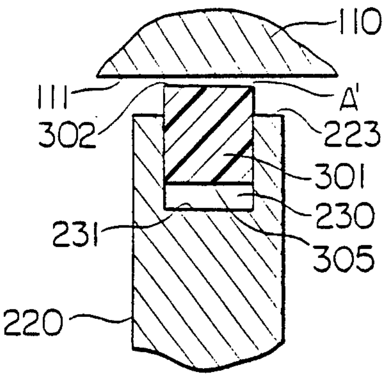
FIG. 11 is a cross-sectional view of the same portion as in FIG. 10, showing the state in which a gap has been provided between the top surface of the elastic element and the surface of the opposing base plate.

However, instead of this type of contact seal, it is often desirable to have a non-contacting seal in which a minute gap is provided between the top surface 302 of the element 301 and the top surface of the opposing base plate so as to decrease friction and wear of the element 301. In other words, as shown in FIG. 11, it is desirable to produce a minute gap of size A' between the top surface 302 of the element 301 and the top surface 111 of the base plate of the stationary scroll 100. To provide such a minute gap, it is necessary merely to offset the stationary scroll 100 with respect to the top surface 302 of the element 301 by an amount A'. Two different methods of providing such a minute gap between the element 301 and the opposing base plate will now be described with the aid of FIGS. 12 and 13.

Figure 12:
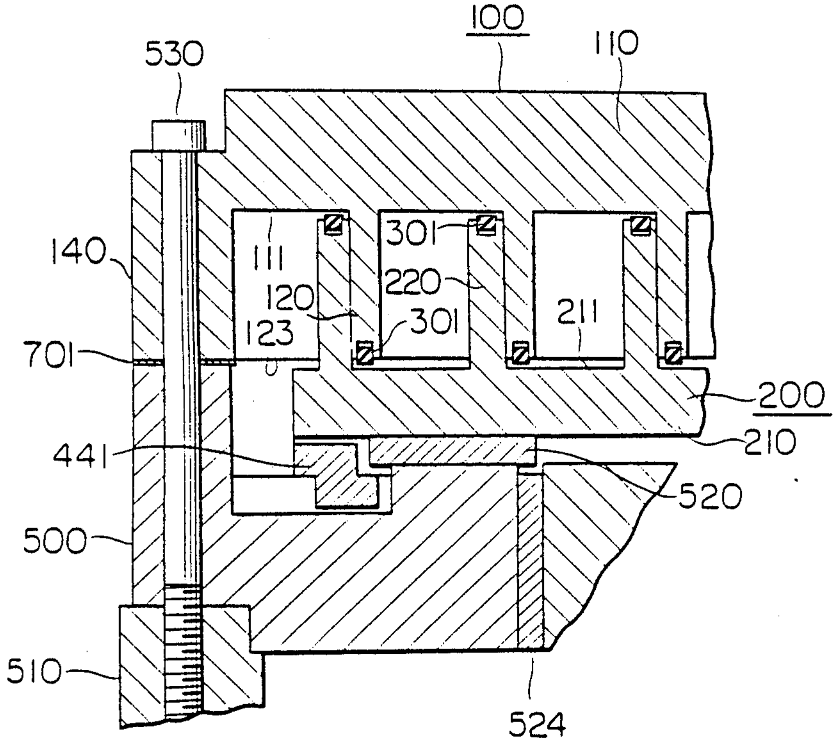
FIG. 12 is a cross-sectional view of a portion of the scroll portion and the support portion, illustrating one method for obtaining the gap illustrated in FIG. 11.

According to a first method of providing a gap as illustrated in FIG. 12, the assembly method described with reference to FIG. 8 is first carried out. Namely, the stationary scroll 100 and the moving scroll 200 are combined so that there is a gap of length A between the top surface of each spiral wrap and the opposing base plate. However, instead of then securing the stationary scroll 100 to the upper frame 500, the stationary scroll 100 is then removed from the moving scroll 200, being careful not to change the amount by which the elements 301 protrude from the grooves, and a ring-shaped washer 701 having an inner and outer diameter corresponding to that of the mounting surface 501 of the upper frame 500 is placed on the mounting surface 501. The washer 701 has a uniform thickness A' equal to the size of the desired gap between the top surfaces 302 of the elements 301 and the base plates of the opposing scrolls. The stationary scroll 100 is then placed atop the moving scroll 200 with the top surface 141 of its outer periphery 140 seating on the washer 701. The moving scroll 200 and the upper frame 500 are then bolted to the lower frame 510 by bolts 530. While the elements 301 still protrude from the grooves 130 and 230 by an amount A, the top surface of each spiral wrap is now displaced from the top surface of the opposing base plate by an amount A+A', and accordingly a minute gap of size A' is obtained between the top surface 302 of each element 301 and the top surface of the base plate of the opposing scroll.

Figure 13:
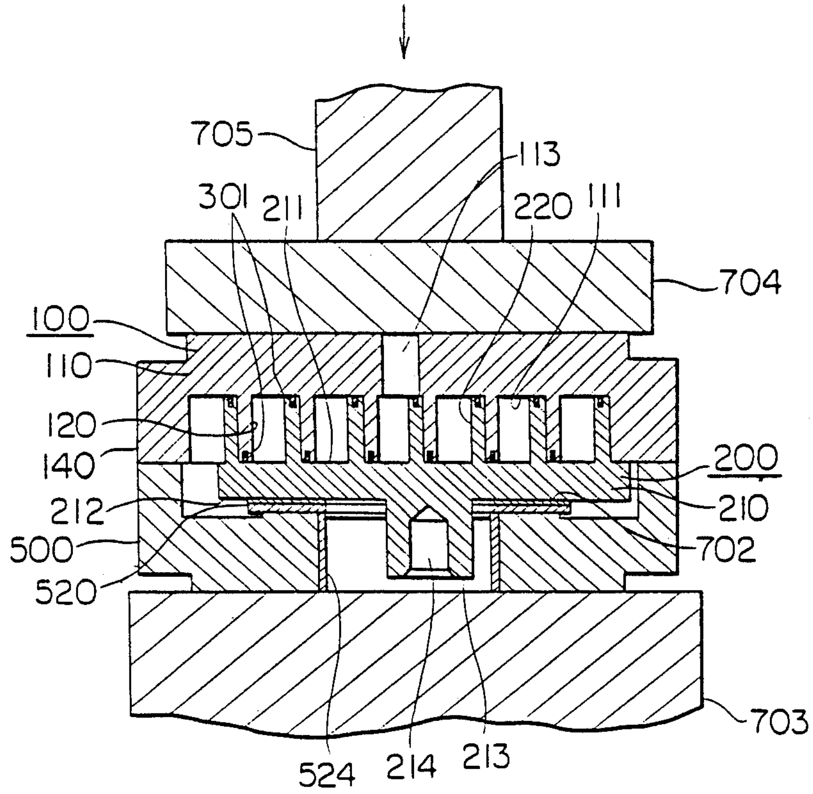
FIG. 13 is another cross-sectional view of the scroll portion, illustrating another method for obtaining the gap illustrated in FIG. 11.

A second method of providing a gap is illustrated in FIG. 13. The upper frame 500 is placed on a base 703 having a flat and level upper surface. A ring-shaped washer 702 having a uniform thickness of A' and dimensions corresponding to those of the upper thrust bearing 520 is placed on top of the upper thrust bearing 520, and the moving scroll 200 is placed on top of the washer 702. The elastic elements 301 are then placed in the grooves of the spiral wraps of the stationary scroll 100 and the moving scroll 200 so that they protrude from the grooves by most of their height, in the same manner as shown in FIG. 8. The stationary scroll 100 is then placed over the moving scroll 200 in the same manner as described with respect to FIG. 8 so that the top peripheral surface 141 of the stationary scroll 100 seats on the mounting surface 501 of the upper frame 500. The elements 301 are then pressed into the grooves in the same manner as before, but because of the presence of the washer 702, the elements 301 will be pressed into the grooves until they protrude by an amount equal to A −A'. When the stationary scroll 100 is placed on the upper frame 500, a block 704 having flat and level top and bottom surfaces is placed on the stationary scroll, and pressure is applied to the block 704 from above by a press 705 or the like in the direction indicated by the arrow. In this manner, pressure can be uniformly applied to the scrolls, and the elements 301 are pressed into the grooves so as to protrude uniformly for their entire length.

The pressure is then released, the block 704 is removed from the stationary scroll 100, the stationary scroll 100 and the moving scroll 200 are then removed individually so as not to change the amount by which the elements 301 protrude from the grooves, and the washer 702 is removed from the upper thrust bearing 520. The moving scroll 200 is then directly mounted on the upper thrust bearing 520 without the washer 702, the stationary scroll 100 is placed over the moving scroll 200 so that it seats on the mounting surface 501 of the upper frame 500, and the stationary scroll 100 is then bolted to the upper frame 500 by the bolts 530. When the stationary scroll 100 and moving scroll 200 are reassembled without the washer 702, the top surface of each spiral wrap is separated from the top surface of the opposing base plate by an amount A. Since the elements 301 were previously adjusted so as to protrude from the grooves in the spiral wraps by an amount A−A', the desired gaps of size A' are achieved between the top surfaces 302 of the elements 301 and the base plates.

The operation of the present embodiment will now be explained. When the motor is energized and the rotor 403 is caused to rotate, the main shaft 410 rotates together with the rotor 403. The rotation of the main shaft 410 is transmitted to the shaft 213 of the moving scroll 200 by the eccentric bushing 430 which fits in the eccentric hole 413 in the main shaft 410. The moving scroll is guided by the Oldham's coupling and performs planetary movement about the center of the stationary scroll 100 without rotating about its own axis, producing compression in the conventional manner for a scroll-type compressor.

A fluid to be compressed enters the shell 6 via the intake pipe 603. As it flows through unillustrated channels to reach the intake port 126 formed in the left side of the stationary scroll 100 in FIG. 1, it cools the stator 401, the rotor 403, and other parts. It is drawn into the compression chambers formed between the scrolls and is compressed, reaching a maximum pressure in the central compression chamber. !t is then exhausted from the scrolls via the exhaust port 113 formed in the base plate 110 of the stationary scroll 100 and passes out of the compressor through the exhaust pipe 604 which communicates with the exhaust port 113.

The oil supply system of the present embodiment will now be explained. The lubricating oil 700 which is accumulated in the bottom portion 602 of the shell 6 is sucked up the main shaft 410 by the eccentric oil supply holes 411 formed therein. When the oil reaches the eccentric hole 413 in the increased diameter portion 412 of the main shaft 410, it is forced outwards by centrifugal force and is supplied to the eccentric bushing 430. After lubricating the upper thrust bearing 520, the lower thrust bearing 522, the upper journal bearing 524, the lower journal bearing 525, and the Oldham's coupling via oil supply holes and channels (not illustrated) formed in the main shaft 410 and the eccentric bushing 430, a portion of the oil is sucked into the compression chambers in the scrolls together with the fluid to be compressed. This oil serves to lubricate the scrolls as well as to seal the minute gaps formed between the top surface 302 of each element 301 and the top surface of the opposing base plates. Oil which is entrained with the fluid circulates therewith and returns to the compressor via the intake port 126. However, the great majority of the oil flows downwards and returns to the oil sump in the bottom portion 602 of the shell 6 via oil return holes 505 and 512 provided in the upper frame 500 and the lower frame 510, respectively.

Because the elastic elements 301 can be adjusted so that there is essentially no gap or only a minute gap of a uniform and desired size between the top surface 302 of each element 301 and the top surface of the opposing base plate, an effective contacting or non-contacting seal can be achieved which prevents the leakage of the fluid being compressed in the radial direction from one compression chamber to another, even when due to manufacturing imprecision there is a variation in the size of the gap between the top surface of the spiral wraps and the top surfaces of the opposing base plate.

Furthermore, as shown in FIG. 10 since a gap is provided between the bottom surface 305 of each element 301 and the bottom surface of the groove in which it is disposed, if thermal expansion during operation produces a decrease in the distance between the scrolls, the elastic elements 301 will merely be pushed farther into the grooves by the opposing base plates and excess pressure between each element 301 and the opposing base plate will be relieved, so that an effective seal can still be achieved while sufficient clearance between the base plates and spiral wraps opposing scrolls is also maintained.

An effective seal in the spiral direction between adjacent pressure chambers is achieved by the contact between the side surfaces of the spiral wraps of the stationary scroll 100 and the moving scroll 200. Centrifugal force pushes the spiral wrap 220 of the moving scroll 200 against the spiral wrap 120 of the stationary scroll 100, thereby achieving the suitable contact. The mechanism for providing this centrifugal force will now be described with the aid of FIGS. 14 and 15.

Figure 14:
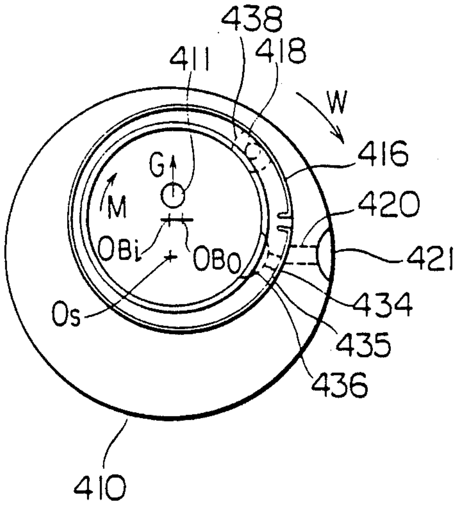
FIG. 14 is a top view of the eccentric bushing as mounted in the main shaft of FIG. 4.

FIG. 14 shows a top view of the eccentric bushing 430 as installed in the main shaft 410. Os indicates the center of rotation of the main shaft 410. The position of the spring pin 418 is chosen such that a straight line between Point OBo, the center of the outer peripheral surface 433 of the eccentric bushing 430, and Point OBi, the center of the inner surface 434 of the eccentric bushing 430, is substantially perpendicular to a line connecting Point OBi and Point Os. The diameter of the rotation-preventing hole 438 is made bigger than the diameter of the spring pin 418 so that the eccentric bushing 430 can move to a certain extent in the circumferential direction. Furthermore, the cut-out 437 formed in the outer periphery of the bushing 430 has a prescribed length in the circumferential direction so that the oil supply hole 435 in the eccentric bushing 430 and the oil supply hole 420 cut in the radial direction in the large-diameter portion 412 of the main shaft 410 communicate with one another even when the eccentric bushing 430 is rotated. The oil supply hole 420 also communicates with the axially-extending oil supply groove 421 provided in the outer peripheral surface of the large-diameter portion 412 of the main shaft 410.

The shaft 213 of the moving scroll 200 is fit into the eccentric bushing 430 so that it can rotate freely with respect to the bushing 430. Accordingly, the center OBi of the inner surface 433 of the eccentric bushing 430 coincides with the center of gravity of the moving scroll 200. When the main shaft 410 rotates in the direction of the arrow W in FIG. 14, centrifugal force is developed in the direction of the arrow G along the line connecting the rotational center Os of the main shaft and the center OBi of the inner surface of the eccentric bushing 430, and a moment applied to the eccentric bushing 430 in the direction indicated by the arrow M develops about the center OBo of the outer surface of the eccentric bushing 430. Therefore, if there is a gap between the sides of adjoining spiral wraps of the stationary scroll 100 and the moving scroll 200, the eccentric bushing 430 rotates in the direction of the arrow M about the center OBo of the outer surface of the eccentric bushing 430 so that the moving scroll 200 will move until the sides of the spiral wraps contact one another.

Figure 15:
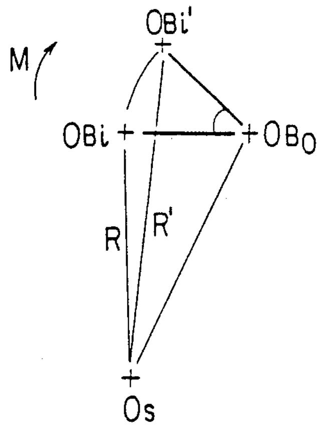
FIG. 15 illustrates the movement of the center of gravity of the eccentric bushing when the main shaft is rotated.

The above-described change in the position of the center will be described with the help of FIG. 15. The eccentric bushing 430 rotates about the center OBo of the outer surface of the eccentric bushing 430 in the direction shown by the arrow M, and the center OBi of the inner surface of the ccentric bushing 430 shifts to point OBi' when the spiral wraps contact one another. The radius of planetary motion of the moving scroll 200 changes from the distance between Os and OBi=R to the distance between Os and OBi'=R'. Conversely, in the case when the manufacturing precision is such that the radius of planetary motion is smaller than R, the eccentric bushing 430 rotates in the direction opposite to that indicated by the arrow M. This also occurs at the time of the intake of foreign materials into the space between the spiral wraps or during slugging.

In this manner, the eccentric bushing 430 absorbs variations in manufacturing precision, makes assembly easier, and prevents leakage of compressed cooling gas at the time of compression in the spiral direction between the spiral wraps, thereby increasing compression efficiency. In addition, it has resistance to the intake of foreign materials and to slugging and contributes to an increase in reliability.

Next, other embodiments of the present invention will be explained while referring to FIGS. 16 through 29. In these embodiments, only the gap adjustment means are illustrated, the other features of the embodiment being the same as in the embodiment of FIG. 1. Furthermore, while only the gap adjustment means for the moving scroll 200 is illustrated, the same means are of course used with the stationary scroll 100 as well.

Figure 16:
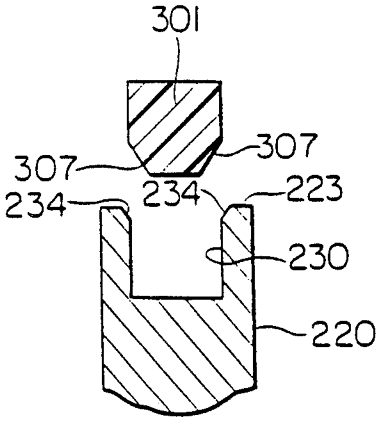
FIG. 16 is a cross-sectional view of the radial sealing means according to a second embodiment of the present invention.

In the embodiment of FIG. 16, in order to make the insertion of the element 301 into the groove 230 easier at the time of its installation, bevelled portions 307 and 234 which extend along the length of the element 301 and the groove 230 are formed in the lower end portions of both side surfaces of the element 301 and at the upper end portions of both side surfaces of the groove 230.

Figure 17:
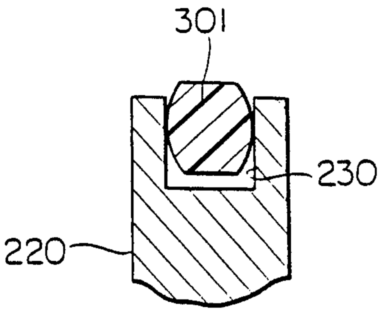
FIGS. 17 through 25 are cross-sectional views of a third through eleventh embodiment, respectively, of the present invention in which different radial sealing means are employed.

In the embodiment of FIG. 17, the insertion of the element 301 into the groove 230 is made easier by making the cross-sectional shape of the element 301 swollen in its center so that the sides curve outwards towards the sides of the groove 230.

Figure 18:
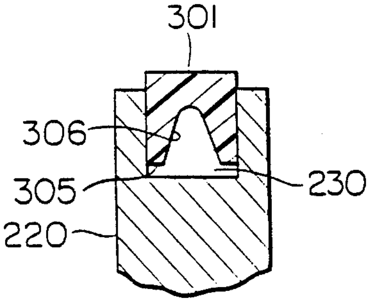

In the embodiment of FIG. 18, a recessed portion 306 which extends in the lengthwise direction of the spiral and opens onto the bottom surface 305 of the element 301 is provided therein. The insertion into the groove 230 is made easier, and at the same time, the elastic force of the element 301 more effectively presses the sides of the element 301 against the corresponding sides of the groove 230.

Figure 19:
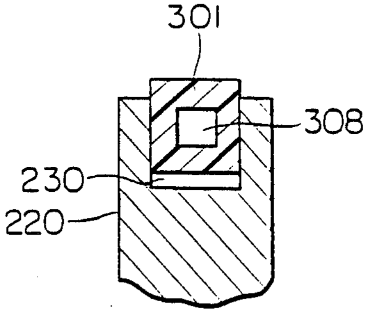

In the embodiment of FIG. 19, a hollow portion 308 which extends in the lengthwise direction of the spiral and whose periphery is entirely surrounded by the walls of the element 301 is provided in the element 301. The hollow portion 308 makes the insertion of the element 301 into the groove 230 easier and improves the contact between the sides of the element 301 and the sides of the groove 230.

FIGS. 20 through 24 show embodiments in which the gap adjustment means comprises a first elastic element 310 and a second elastic element 320, both of which extend along the entire length of the groove 230. The second elastic element 320 serves to press a side or sides of the first elastic element 310 against the sides of the groove 230 so that the contact between the first element 310 and the groove 230 will be improved.

Figure 20:
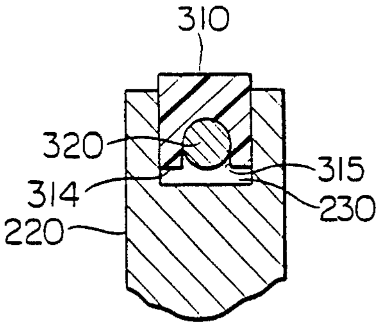

Namely, FIG. 20 shows an embodiment in which a first elastic element 310 has a recessed portion 315 which extends along the length thereof and opens onto its bottom surface 314, and a second elastic element 320 which has a circular cross section and which extends for the length of the first element 310 is fitted within the recessed portion 315 so as to push the sides of the first element 310 outwards towards the sides of the groove 230.

Figure 21:
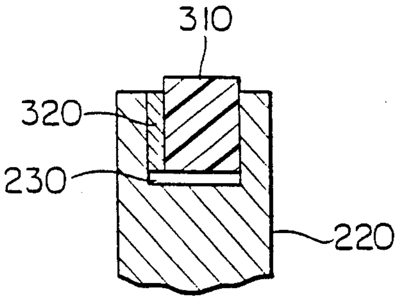

FIG. 21 shows an embodiment in which the second elastic element 320 extends along the length of the first element 310 and is placed between one side of the first element 310 and the corresponding side of the groove 230 so as to press the opposite side of the first element 310 against the groove 230. The height of the second elastic element 320 can be less than that of the first elastic element 310 as it is not necessary for the second elastic element 320 to ever contact the base plate of the opposing scroll.

Figure 22:
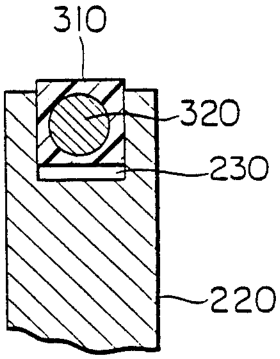

In FIG. 22, a second elastic element 320 which extends along the length of the first elastic element 310 is completely imbedded within the first element 310. Although the second elastic element 320 is shown with a circular cross section, other shapes can also be used effectively.

Figure 23:
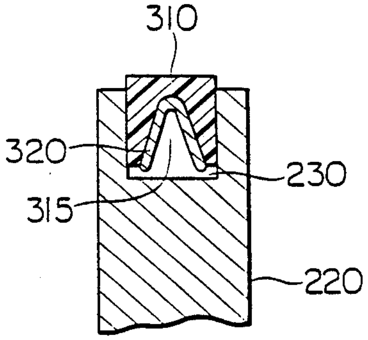

FIG. 23 shows an embodiment in which a recessed portion 315 which extends along the length of the first elastic element 310 is provided in its lower surface, and the second elastic element 320 comprises a metal spring having a V-shaped cross section which is provided inside the recess 315 so that the sides of the spring press against the sides of the recess 315, thereby pushing the sides of the first elastic element 310 against the sides of the groove 230.

In addition to improving the contact with the sides of the groove, the embodiments of FIGS. 20 through 23 provide the advantage that two different materials can be used for the first and second elastic elements, permitting a wider choice of materials. Namely, in the embodiments of FIGS. 16 through 19, the elastic properties of the single elastic element 301 must be sufficient to hold the element 301 in the groove 230, and at the same time it preferably has self-lubricating properties. On the other hand, in the embodiments of FIGS. 20 through 23, as the first element 310 is pressed against the sides of the groove 230 by the second element 320, the elastic properties of the first element 310 are not so important, and as the second element 320 need never contact a moving member, it does not need to have self-lubricating properies.

Figure 24:
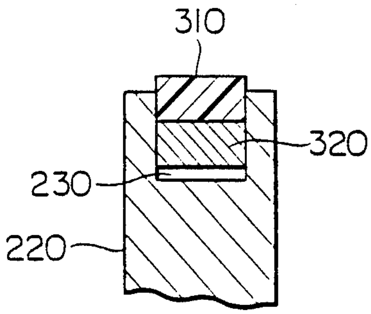

In the embodiment of FIG. 24, the gap adjustment means comprises a first elastic element 310 which is secured to the top surface of a second elastic element 320, both sides of the second elastic element 320 being in intimate contact with the sides of the groove 230. Whereas in the previous embodiments the first element 310 also needed to be in intimate contact with the sides of the groove 230 in order to prevent its coming out, in this embodiment the first element 310 is held in place by the second element 320 and therefore need not even contact the sides of the groove 230. As the first element 310 serves primarily to provide a radial seal, it can be made much thinner than the second element 320, and in the extreme case can be a mere coating of a suitable material applied to the top surface of the second element 320.

Figure 25:
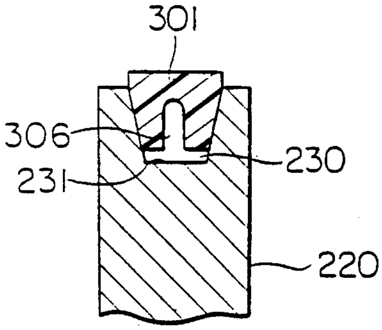

In the embodiment of FIG. 25, both sides of the groove 230 are tapered inwards towards the bottom surface 231 of the groove 230. Similarly, both sides of the element 301 are tapered towards the bottom of the element 301, and a U-shaped recess 306 opening onto the bottom surface of the element 301 is provided in the center of the element 301. Such a shape prevents the element 301 from being pushed too far into the groove 230, since the farther the element 301 is pressed into the groove 230, the greater is the force which is required. The U-shaped recess 306 makes insertion of the groove 230 easier.

Figure 26:
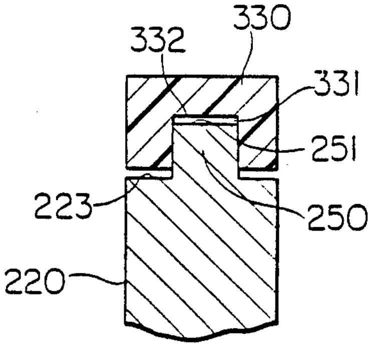
FIG. 26 is a cross-sectional view of a twelfth embodiment of the present invention in which the radial sealing comprises an elastic element which fits on top of the end of a spiral wrap rather than into a groove in the wrap.

FIG. 26 shows an embodiment in which instead of a groove, a prismatic protrusion 250 which extends along the length of the spiral wrap 220 is formed in the top surface 223 thereof. Furthermore, instead of the elastic element fitting inside a groove, the elastic element 330 is formed with a groove 331 in its bottom surface corresponding to the shape of the protrusion 250, and the element 330 fits on top of the protrusion 250 and is supported thereby. The width of the protrusion 250 is selected to be greater than or equal to the width of the groove 331, and the element 330 is made of an elastic material. When the element 330 is placed atop the protrusion 250, the sides of the element 330 are flexed outwards, and the element 330 is held on top of the protrusion 250 by friction. The dimensions of the groove 331 are chosen such that when the element 330 is mounted on the protrusion 250, gaps will be left between the bottom surface of the element 330 and the top surface 223 of the portion of the spiral wrap 230 outside of the groove 331, and between the bottom surface 332 of the groove 331 and the top surface 251 of the protrusion 250. In this manner, it is possible for the element 330 to be pushed farther downwards on the protrusion 250 when thermal expansion of the scrolls produces a decrease in the clearance between the base plates of the scrolls and the spiral wraps, provided of course, that the element 330 is supported on protrusion 250 by friction.

Figure 27:
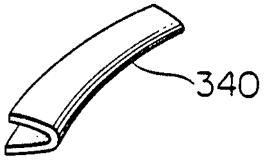
FIG. 27 is a perspective view of an elastic or plastic support member for use with a thirteenth embodiment of the present invention.
Figure 28:
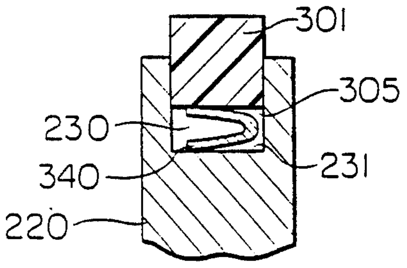
FIG. 28 is a cross-sectional view of a portion of the spiral wrap according to a thirteenth embodiment of the present invention in which the elastic element is supported from below by the support member illustrated in FIG. 27.
Figure 29:
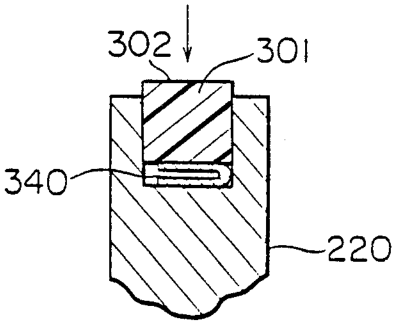
FIG. 29 is a cross-sectional view similar to FIG. 28, showing the state in which the elastic element has been pressed into the groove in the end of the spiral member.

FIGS. 27 through 29 show yet another embodiment in which an elastoplastic material 340 which easily undergoes elastic or plastic deformation is provided between the bottom surface 231 of the groove 230 and the bottom surface 305 of the elastic element 301 in order to prevent the movement of the element 301 into the groove 230 more than is necessary. Namely, a thin plate-shaped elastoplastic material 340 such as lead is bent into the shape of a V and is provided between the bottom surface 231 of the groove 230 and the bottom surface 305 of the element 301 so as to extend along the length of the groove 230, as shown in FIG. 28. When pressure is applied to the top surface 302 of the element 301 as indicated by the arrow in FIG. 29, the elastoplastic material 340 will undergo plastic deformation and support the element 301 from its bottom surface 305, assuming an appropriate shape. In this manner, the element 301 is supported from below as well as by friction between the sides of the element 301 and the sides of the groove 230, and therefore the element 301 is more reliably supported inside the groove 230.

Although the elastoplastic material 340 is illustrated with an elastic element 301 of the type shown in FIG. 3, it can be used with an elastic element of the type employed in any of the embodiments of FIGS. 16 through 26 as well.

In each of the previous embodiments, the gap adjustment element is held in the corresponding groove (or on a protrusion, in the case of FIG. 26) by friction between it and the sides of the groove. However, it is also possible to support the gap adjustment element in a groove or on a protrusion by means of bonding, solvent welding, or the like.

If solvent welding is used, the gap adjustment elements are first inserted in the grooves using any of the preceding methods so that a gap of a desired size is obtained between the top surface of the element and the top surface of the opposing base plate. Then, heat is applied by a suitable heating means to the element and/or the groove to cause the welding of the sides of the element to the sides of the groove. A laser may be used as this heating means. When the element has solidified, it will be securely supported by the sides of the groove. Prior to the insertion of the elements into the groove, it is desirable to roughen the sides of the element and the groove or even to produce protrusions and indentations in the surfaces, thereby improving the adhesion between the two.

Solvent welding may be carried out by mere physical welding, or it may be carried out by molecular bonding.

If the elements are supported in the grooves by bonding, a slow-setting or relatively quick-setting bonding agent is applied to the sides of the elements and/or the grooves at the time of insertion of the elements into the grooves, and the size of the gap between the top surface of the element and the top surface of the opposing base plate is adjusted by any of the previous methods. The drying characteristics of the bonding agent and the time for its application should be selected so that the bonding agent will not harden prior to the adjustment of the size of the gap. As with solvent welding, it is desirable to roughen the sides of both the element and the groove or even to produce protrusions and indentations in the surfaces so as to improve the adhesion between the two.

Although the preceding description of the present invention was made with respect to a compressor like the one illustrated in FIG. 1, a scroll-type apparatus according to the present invention is not limited to use as a compressor, but can be used as an expander, a pump, or the like.

Furthermore, although the scroll-type apparatus in the illustrations is vertically disposed, this is to permit the lubricating oil 700 to flow downwards and return to the oil sump due to gravity. If other means are utilized for the return of oil, the present invention can be applied to a horizontally or otherwise disposed compressor or the like and still provide the same beneficial effects.

What is claimed is:

1. A process for assembly of a scroll-type apparatus, comprising the steps of:

(a) supporting a gap adjustment element on the top portion of the spiral wrap of a moving scroll comprising a base plate and a spiral wrap integrally formed with the base plate such that the gap adjustment element extends beyond the top surface of the spiral wrap of the moving scroll for most of the height of the gap adjustment element;

(b) supporting a gap adjustment element on the top portion of the spiral wrap of a stationary scroll comprising a base plate and a spiral wrap integrally formed with the base plate such that the gap adjustment element extends beyond the top surface of said spiral wrap for most of the height of the gap adjustment element;

(c) combining said moving scroll and said stationary scroll such that the base plate of said moving scroll is parallel to the base plate of said stationary scroll and such that the top surface of each spiral wrap is separated from the base plate of the other scroll by a gap smaller than the amount by which each of said gap adjustment elements extended beyond the top surface of their respective spiral wraps prior to said combining, such that each gap adjustment element is pushed in the axial direction by the base plate of the other scroll so that the top surface of each gap adjustment element extends beyond the top surface of its respective spiral member by an amount equal to said gap to form a non-pressurized seal.

2. A process as claimed in claim 1, wherein said combining step comprises:

(a) supporting said moving scroll on a frame such that the bottom surface of said base plate of said moving scroll rests on the top surface of said frame;

(b) placing said stationary scroll over said moving scroll such that the base plate of said moving scroll is parallel to the base plate of said stationary scroll and the outer periphery of said spiral wrap of said stationary scroll is supported by a support surface formed on the outer periphery of said frame and such that the top surface of the spiral wrap of each scroll is separated from the base plate of the other scroll by a first uniform gap, whereby each gap adjustment element is pushed in the axial direction by the base plate of the other scroll such that its top surface extends beyond the top surface of the spiral member by which it is supported by an amount equal to said first gap;

(c) removing said stationary scroll from said moving scroll without changing the amount by which said gap adjustment elements extend beyond the top surfaces of the spiral wraps by which they are supported;

(d) placing a ring-shaped washer on top of said support surface of said frame;

(e) placing said stationary scroll over said moving scroll such that the outer periphery of said stationary scroll is supported on said washer, whereby a second uniform gap equal to the thickness of said washer is formed between the top surface of the gap adjustment element of each scroll and the top surface of the base plate of the other scroll; and (f) securing said stationary scroll to said frame so as to maintain said second gaps between said elements and said base plates.

3. A process as claimed in claim 1, wherein said combining step comprises:

(a) supporting said moving scroll on a ring-shaped washer disposed on the top surface of a frame such that the base plate of said moving scroll rests on said ring-shaped washer and is parallel to the top surface of said frame;

(b) placing said stationary scroll over said moving scroll such that the base plate of said moving scroll is parallel to the base plate of said stationary scroll and the outer periphery of said spiral wrap of said stationary scroll is supported by a support surface formed on the outer periphery of said frame and such that the top surface of each spiral wrap is separated from the base plate of the other scroll by a first uniform gap, whereby each gap adjustment element is pushed in the axial direction by the base plate of the other scroll such that its top surface extends beyond the top surface of the spiral member by which it is supported by an amount equal to said first gap;

(c) removing said stationary scroll from said moving scroll without changing the amount by which said gap adjustment elements extend beyond the top surfaces of the spiral wraps by which they are supported;

(d) removing said moving scroll and said washer from said frame;

(e) placing said moving scroll on the top surface of said frame without said washer such that the base plate of said moving scroll is supported by the top surface of said frame;

(f) placing said stationary scroll over said moving scroll such that the outer periphery of said stationary scroll is supported on said support surface, whereby a second uniform gap equal to the thickness of said washer is formed between the top surface of the gap adjustment element of each scroll and the top surface of the base plate of the other scroll; and (g) securing said stationary scroll to said frame so as to maintain said second gaps between said elements and said base plates.

4. A process as claimed in claim 1, wherein each of said gap adjustment elements is supported by frictional force between the element and the top portion of the spiral wrap which supports it.

5. A process as claimed in claim 1, wherein each of said gap adjustment elements is supported by bonding to the top portion of the spiral wrap which supports it.

6. A process as claimed in claim 1, wherein each of said gap adjustment elements is supported by solvent welding to the top portion of the spiral wrap which supports it.

* * * * *